United States Patent
Abramov et al.

(10) Patent No.: US 8,053,704 B2
(45) Date of Patent: Nov. 8, 2011

(54) SCORING OF NON-FLAT MATERIALS

(75) Inventors: Anatoli Anatolyevich Abramov, Painted Post, NY (US); Ljerka Ukrainczyk, Painted Post, NY (US); Qi Wu, Painted Post, NY (US); Naiyue Zhou, Painted Post, NY (US)

(73) Assignee: Corning Incorporated, Corning, NY (US)

(*) Notice: Subject to any disclaimer, the term of this patent is extended or adjusted under 35 U.S.C. 154(b) by 769 days.

(21) Appl. No.: 12/220,948

(22) Filed: Jul. 30, 2008

(65) Prior Publication Data

US 2009/0294419 A1 Dec. 3, 2009

Related U.S. Application Data

(60) Provisional application No. 61/128,949, filed on May 27, 2008.

(51) Int. Cl.
 B23K 26/06 (2006.01)
 B23K 26/36 (2006.01)
(52) U.S. Cl. .................. 219/121.68; 219/121.75; 225/2; 225/96; 65/105; 65/271
(58) Field of Classification Search ............. 219/121.68, 219/121.69, 121.75; 225/2, 96; 65/105, 65/271
See application file for complete search history.

(56) References Cited

U.S. PATENT DOCUMENTS

| | | | |
|---|---|---|---|
| 4,490,608 A * | 12/1984 | Yeadon et al. | 250/235 |
| 5,609,284 A | 3/1997 | Kondratenko | 225/1 |
| 5,623,473 A * | 4/1997 | Ichihara | 430/321 |
| 5,776,220 A | 7/1998 | Allaire et al. | 65/112 |
| 5,984,159 A | 11/1999 | Ostendarp et al. | 225/93.5 |
| 6,211,488 B1 | 4/2001 | Hoekstra et al. | 219/121.72 |
| 6,327,875 B1 | 12/2001 | Allaire et al. | 65/103 |
| 6,800,831 B1 | 10/2004 | Hoetzel | 219/121.72 |
| 6,972,268 B2 * | 12/2005 | Ehrmann et al. | 438/795 |
| 2006/0021997 A1 | 2/2006 | Menegus | 219/121.69 |
| 2007/0151962 A1 | 7/2007 | Doll et al. | 219/121.72 |

* cited by examiner

*Primary Examiner* — Samuel M Heinrich
(74) *Attorney, Agent, or Firm* — Jeffrey A. Schmidt (57) ABSTRACT

Disclosed are systems for scoring non-flat materials including non-flat glass sheets (1000). In one embodiment, a laser scoring system is described. The laser scoring system includes a laser (102) and an optical head (106). The optical head (106) is configured to receive output from the laser (102) and focus the output into an elongated laser beam having a beam waist and an extended focal depth of greater than +/−5 mm relative to the center of the beam waist with a power density sufficient for scoring a material having at least a portion within the extended focal depth. In one aspect the system can include a beam expander (104). The beam expander (104) receives the output from the laser (102), expands the output from the laser to an expanded laser beam, and transmits the expanded laser beam to the optical head (106).

20 Claims, 11 Drawing Sheets

SCORING OF NON-FLAT MATERIALS

RELATED APPLICATION

This application claims the benefit of and priority to U.S. Provisional Application Ser. No. 61/128,949 filed on May 27, 2008, the contents of which are relied upon and incorporated herein by reference in its entirety.

FIELD OF THE INVENTION

Embodiments described herein relate to scoring of non-flat materials and, more particularly, laser scoring of large non-flat glass.

TECHNICAL FIELD

In the past, several different methods and techniques have been used to separate glass sheets. Widely used methods include the use of lasers to score and/or separate glass sheets. The laser beam is moved across the glass sheet and creates a temperature gradient on the surface of the glass sheet, which is enhanced by a coolant (such as a gas or liquid) that follows the laser beam at some distance. Specifically, the heating of the glass sheet by the laser and the cooling of the glass sheet by the coolant creates stresses in the glass sheet. In this manner, a score line is created along the glass sheet. The glass sheet can then be separated into two smaller sheets by separating the glass sheet along the score line.

Considerable efforts have been dedicated to developing systems and methods for scoring glass sheets with lasers, particularly the glass sheets that are used in the production of flat panel displays (such as LCD). Generally, a laser scoring process for glass uses $CO_2$ laser radiation at the wavelength of about 10.6 µm to heat the glass and then rapid cooling to create transient tensile stress via thermal shock, though other lasers can be used. In order to perform consistent laser scoring, the laser beam should have a certain shape and be focused or defocused on a glass surface to deliver constant laser power to the glass with minimum variations. The size of the beam (length and width) on glass surface, its shape and corresponding power density should be substantially constant along the score line during the entire scoring process. The foregoing means, that conventionally the distance between the glass surface and the laser shaping lenses needed to be precisely retained, or, in other words, the glass sheet has to be positioned within a range as short as approximately 1 mm, for typical optics used for glass scoring purposes. Furthermore, when flying optics are utilized for scoring (when the optics move relative to the glass), the beam spot size on the glass should be substantially unchanged over the entire scoring length.

Previous attempts to resolve these challenges comprised flattening the glass sheet, for example by placing (or moving) it on a flat horizontal table and by having the optics (sometimes including the laser) fixed or moved above the glass at a certain constant distance. While this provides one solution for scoring glass, other challenges are present. For example: the glass sheet may have a natural shape and may be not flat; the motion system and the machine design may not provide enough accuracy to maintain the required distance between the glass and the optics; or the system can be affected by vibrations, particularly if the machine structure is not rigid or not heavy enough, and the beam spot size on the glass may be significantly changed over the flying distance. All these challenges become more severe for large glass sizes. Furthermore, other difficulties in attempting to maintain the beam spot size during the scoring process arise, for example, when on draw the glass sheet is positioned vertically, has a bow (e.g., 5-20 mm), varies in thickness, or can randomly move relative to the optics from its nominal position during the drawing process. One possible solution for this is to use an adaptive optics with control, which measures the distance to the glass and moves the optics toward or away from the glass, correspondingly, to maintain the required distance. However, this approach is technically complex and also expensive.

Thus, there is a need for methods and systems that overcome challenges in the art, some of which are described above.

SUMMARY

Described herein are embodiments of a scoring system for non-flat materials comprised of a laser and an optical system and methods of its use.

Embodiments of the optical system are described herein, which can be used for scoring of non-flat glass sheets having different shapes or variable thickness and which can tolerate significant changes of the distance between the glass surface and beam shaping lenses. In one embodiment, the optical system creates a laser beam with elongated focal depth (i.e., greater than about +/−5 mm relative to the center of the beam waist) of nearly constant power density, which makes laser scoring process much less sensitive to the location of the glass sheet relative to the optical system.

Another aspect embodies a beam delivery system including a flying optical head, which achieves an extended flying distance without substantial changes of the beam size on the glass and its corresponding power density in addition to the capability to score non-flat glass. For example, in one aspect an extended flying distance of up to 6 meters can be obtained without substantially changing beam size, shape and, correspondingly, its power density.

In various aspects, embodiments described herein can be used for an on-draw laser scoring process; scoring of non-flat glass having a bow or other shape; scoring of moving glass with variable distance from the optical system without using adaptive optics; laser scoring with less sensitivity to the exact location of the glass surface relative to the beam shaping optics; simplifying alignment tolerances and accuracy requirements for the mechanical parts, such as machine frame, linear slides, and actuators, which also contribute to a lower overall system cost; laser scoring of glass sheets positioned vertically; and scoring of glass with variable thickness, among other uses.

Additional embodiments of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed and/or as claimed.

BRIEF DESCRIPTION OF THE DRAWINGS

The accompanying drawings, which are incorporated in and constitute a part of this specification, illustrate embodiments and together with the description, serve to explain the principles of the methods and systems disclosed.

DETAILED DESCRIPTION

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a glass sheet includes embodiments having two or more such glass sheets unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Exemplary," as used herein, means "an example of" and is not intended to convey an ideal or preferred embodiment.

Described herein are embodiments of a laser scoring system including a laser, an adjustable beam expander and an optical head. The optical head is configured to receive output from the laser and the beam expander, and focus the output into an elongated laser beam having a beam waist and an extended focal depth relative to the beam waist with a power density sufficient for scoring a material a portion of which is within the extended focal depth. In one aspect the material being scored is glass and the scoring of the glass is the creation of a partial crack by breaking the molecular bonds through a thermal shock generated by a moving laser beam with subsequent local cooling, as known to one of ordinary skill in the art. The scoring process can be followed by mechanical separation or by other means of separating the material such as, for example, another laser beam of different configuration that performs the separation following the laser scoring process.

Figure 1:
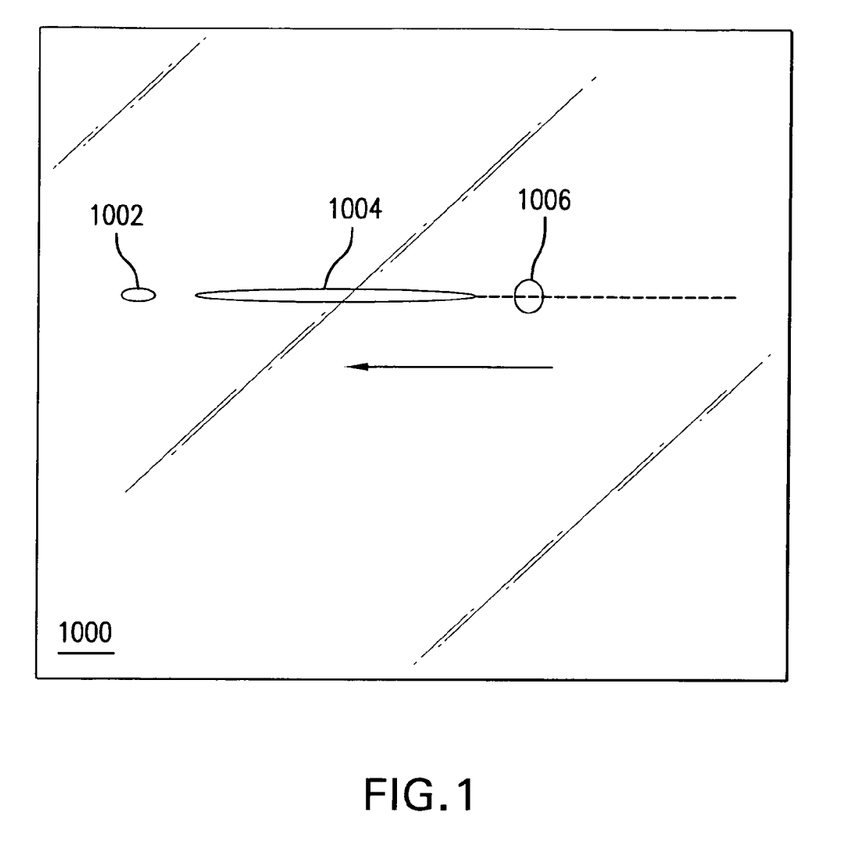
FIG. 1 is an exemplary schematic of a process that can be used to score and separate glass.

FIG. 1 illustrates an exemplary schematic of a process that can be used to score and separate glass 1000. In FIG. 1, crack initiation 1002 can be performed by different methods such as by a laser pulse or mechanically by using, for example, a mechanical tool such as a scribe, scoring wheel, indenter, or some other means of mechanically creating an initial flaw (defect) in the glass 1000. Scoring of the glass 1000 is performed by an elongated laser beam 1004 projected onto the glass surface followed by localized cooling 1006. The laser beam 1004 passes over the initial flaw (defect) 1002 on the glass surface, thus creating and propagating a partial vent across the glass 1000 in the direction that the elongated laser beam 1004 travels. A process of crack extension or full body separation of the glass 1000 can occur through the use of a second laser beam or mechanical separation can be used to separate the glass 1000. The glass 1000 can be scored and separated by moving the glass 1000 relative to the scoring/separation device, by moving the scoring/separation device relative to the glass 1000, or by moving both, the glass 1000 and the scoring/separation device.

As described in the embodiments herein, a laser beam 1004 such as the one shown in FIG. 1 is directed onto the surface of a material such as glass. The laser beam 1004 is of substantially constant size and shape, which is not dependent on the flying distance of the optical head relative to the stationary laser and stationary beam expander and not substantially sensitive to the relative distance between the glass and the beam shaping lenses. Embodiments of the optical system enable laser processing of large glass sizes by providing a flying distance (of the optical head) of up to 6 meters or more after the beam expander; the center of the flying distance (or in other words the location of the beam waist of the circular beam after beam expander) can be adjusted by the beam expander. Furthermore, as described herein, embodiments of the optical system create a laser beam output that is substantially intrinsically insensitive to variation of the position of the glass surface relative to the optical system and are configured to deliver substantially constant beam energy to the glass surface regardless of the glass shape. In one aspect, the optical design provides a substantially consistent elongated beam size having a length and a width on a glass surface with variations in beam width of less than +/−5% within the flying distance, of the flying optical head, of up to 4 m and independent of glass bowing, changes in glass thickness, or movement of the glass relative to the optics of the flying optical head from the nominal target position of the glass such as by, for example, random movement of the glass during the forming process of up to at least 20 mm amplitude.

Figure 2:
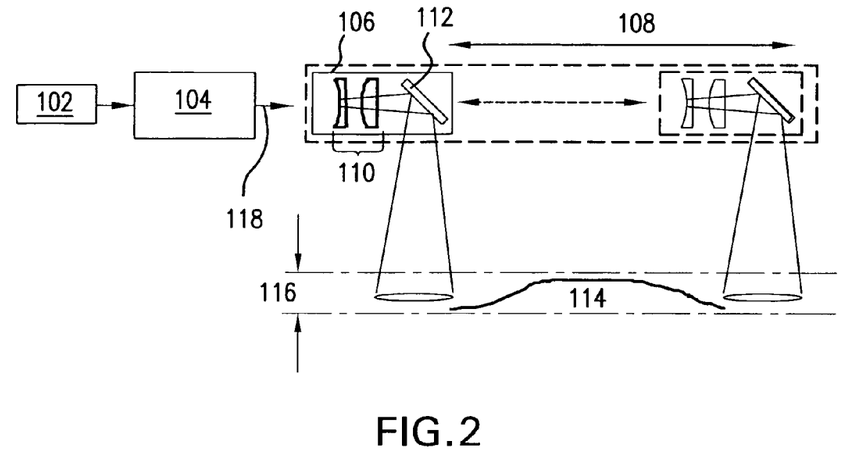
FIG. 2 is an exemplary schematic of a system for laser scoring.

FIG. 2 is an exemplary embodiment of a system for laser scoring that can be used to create a scoring beam 1004 such as the one shown in FIG. 1. As shown in the embodiment of FIG. 2, the exemplary system comprises a laser 102 with a beam expander 104 and an optical head. In this instance, the laser 102 and beam expander 104 are fixed in a stationary position and the optical head is a flying optical head 106 that moves relative to the fixed laser 102 or beam expander 104. The distance that the flying optical head 106 can travel in relation to the fixed laser 102 or beam expander 104 is the flying distance 108. The flying optical head 106 is comprised of beam shaping optics 110 and can further comprise a turning mirror 112, which directs the beam toward the surface being scored. The system can process glass sheets 114 (or other materials) in either vertical or horizontal orientation. The scoring beam has a beam waist and an extended focal depth 116 and power density about the beam waist such that substantially throughout the focal depth 116 the scoring beam can score glass 114. In one aspect the extended focal depth 116 allows scoring of non-flat materials (e.g., glass) where the distance between the surface of the material 114 and the flying optical head 106 varies. This variation can be caused by, for example, bowing of the material, varying thickness, and/or movement of the material. For example, in one aspect the extended focal depth having a power density sufficient for scoring glass can be greater than +/−5 mm about the center of the beam waist. In other aspects the extended focal depth having a power density sufficient for scoring glass can be greater than +/−10 mm, +/−25 mm, +/−50 mm, or more about the center of the beam waist. Power density throughout the focal depth is related to the type of laser used as well as the optical system of the laser scoring system. Power density is inversely proportional to the cross-sectional area of the scoring beam; therefore as distance increases from the center of the beam waist of the scoring beam, the power density will decrease. Different power density can be required for scoring different materials, including different types of glass.

In one exemplary application, an embodiment of the optical system was created through beam propagation analysis assuming the use of a carbon dioxide ($CO_2$) laser working at the wavelength of 10.6 µm, however, the principles disclosed herein can be expanded and applied for different applications using different types of lasers including CO and Nd:YAG lasers, as are known to one of ordinary skill in the art. In one aspect, the optical system can be analyzed based on paraxial Gaussian beam propagation under thin lens approximations, from which the design trade-offs and limitations can be derived. The optical parameters used in the thin lens model can further be refined using optical design software such as ZEMAX (ZEMAX Development Corporation, Bellevue, Wash.), from which lens prescriptions can be generated. Lens sets can be designed to generate different beam sizes, which enable consistent laser scoring processes for different glass types and at different scoring speed.

The stationary part of the beam delivery system as shown in FIG. 2, which includes the laser 102 and beam expander 104, is designed to maintain substantially constant laser beam characteristics throughout the entire flying distance 108 prior to entering the flying optical head 106. Generally, this can be accomplished through active compensation or passive optical design.

In one embodiment, active compensation may be used to maintain substantially constant laser beam characteristics throughout the entire flying distance. Active compensation, also known as "trombone style" sliding optics, is where an optical delay line in sync with the motion of the flying optical head 106 is introduced between the laser 102 and the flying optical head 106, so that the optical path from the laser 102 to the flying optical head 106 is dynamically maintained constant. The travel range of the trombone slide is as long as the flying distance. Alternatively, a beam expander 104 can be actively controlled to track the motion of the flying optics, which requires a much smaller range of motion. In yet another aspect, laser power can be adjusted as the flying optics travel, so as to maintain a constant power density on the material being scored, even though the laser beam size may vary. Any of these approaches may be used in conjunction with the passive optical design described below in order to extend the flying distance.

Another approach comprises a passive optical design that is intrinsically insensitive to the motion of the flying optical head 106. To obtain a uniform beam size over the flying distance, a laser beam is projected from the laser 102, to the beam expander 104 to the flying optical head 106. In one aspect, the laser beam 118 projected from the beam expander 104 to the flying optical head 106 is a Gaussian beam, and the center of the beam waist of the laser beam is projected at the approximate center of the flying distance 108 of the flying optical head 106. The beam waist, for a Gaussian beam or a D mode beam, is the range along the beam axis (along the flying distance) where the spot size will be at a minimum value. If the flying distance is much smaller than the Rayleigh distance, a distance that is known to one of ordinary skill in the art, the beam spot size is relatively unchanged over the flying distance. As such, any flying distance can be accommodated in principle by expanding the laser beam to a sufficiently large size and placing the center of the beam waist at the approximate center of the flying distance. While a large beam size improves the collimation distance, it also makes the beam delivery components more bulky and affects the beam shaping optics. Therefore, design considerations involve the choice of a practically feasible beam size in the flying distance. Furthermore, active adjustment of laser power may be used in conjunction with the passive optical system if a longer flying distance is desired.

As shown in FIG. 2, the flying optical head 106 can house one or more lenses 110, which change the shape of the laser beam 118 received by the flying optical head 106. The beam shaping optics 110 in the flying optical head 106 transform the laser beam from one having a generally circular shape into an elongated, for example elliptical, beam on the surface of the material to be scored, while keeping the size and shape of the elongated laser beam substantially constant regardless of the flying distance and distance between the beam shaping optics 110 of the flying optical head 106 and the glass due to, for example, glass bowing, change in glass thickness, or movement of the glass relative to the optics from the nominal target position of the glass such as by, for example, random movement of the glass during the forming process.

Figure 3:
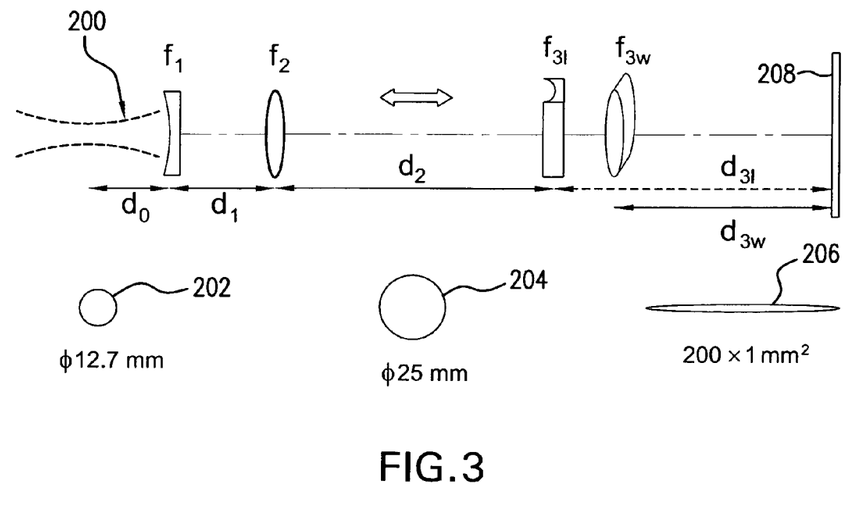
FIG. 3 is a schematic illustration of an exemplary optical system.
Figure 4:
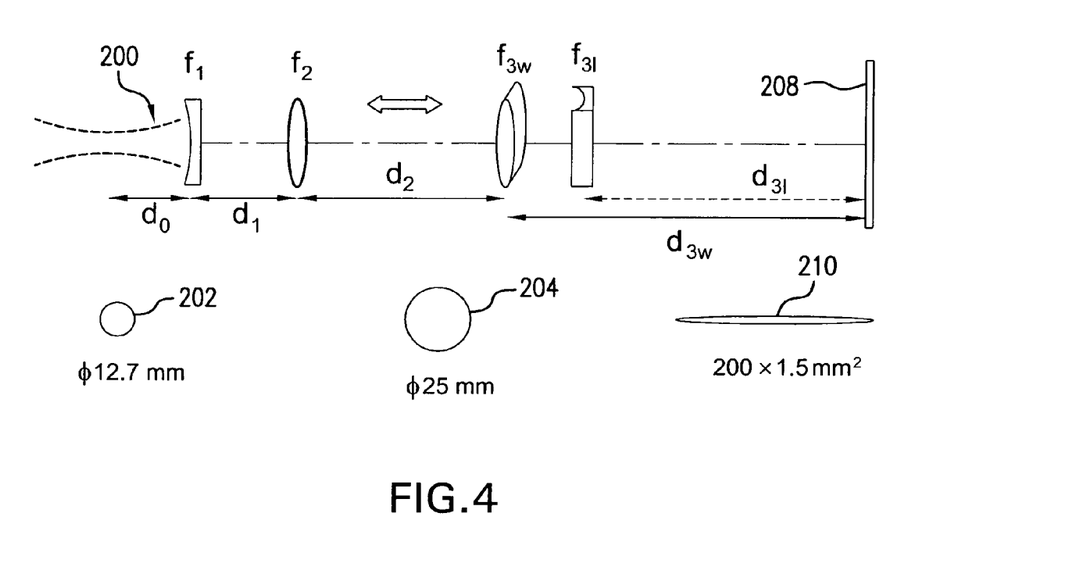
FIG. 4 is a schematic illustration of an alternative exemplary optical system.
Figure 5:
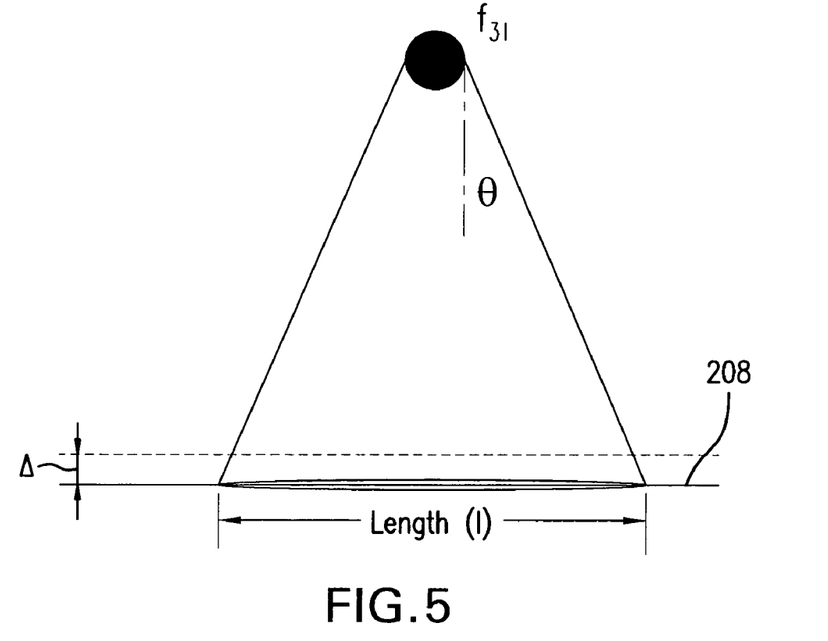
FIG. 5 is a schematic view of the length of an exemplary elongated laser beam that can be produced by the optical system described in FIGS. 3 and 4.
Figure 6:
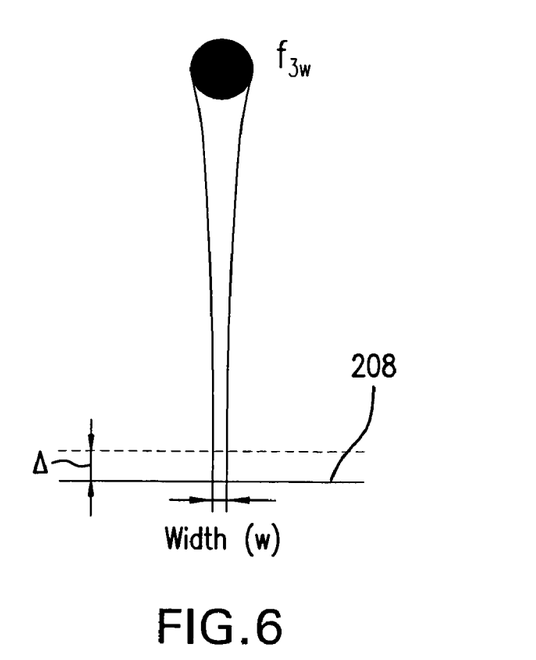
FIG. 6 is a schematic view of the width of an exemplary elongated laser beam that can be produced by the optical system described in FIGS. 3 and 4.

FIGS. 3 and 4 are exemplary optical systems, and FIGS. 5 and 6 are views of an exemplary elongated laser beam that can be produced by the optical systems shown in FIGS. 3 and 4. In these exemplary embodiments, the beam shaping optics 110 includes two cylindrical lenses inside the flying optical head 106, though more or fewer lenses can be used in alternate embodiments. In this example, each lens is responsible for the size of only one major axis (i.e., length, width) of the resultant elongated beam. Alternatively, only one lens can be used, which shapes the beam in both (i.e., length and width) directions simultaneously and can provide for a more compact optical head. On the other hand, a two-lens or multi-lens design provides increased flexibility, which allows independent control over the length and the width of the beam. The choice of optics for the optical system depends on particular application conditions and requirements. The major axes of the elliptical beam, which are preferred for the laser scoring process, can typically vary in the range of about 60 to about 300 mm for the beam length and in the range of from about 1 to about 3.0 mm for the beam width, though other beam lengths and widths are contemplated within the scope of the embodiments described herein. Beam length is generally related to scoring speed at which embodiments of the laser system described herein can score a material such as glass. Typically, the smaller the beam length, the slower the scoring speed. Conversely, the greater the beam length, the greater the scoring speed. Beam width is generally related to straightness of the score—the wider the beam, the more challenging it is to get a straight score line.

FIG. 3 is an example of an optical system (beam expander 104 comprised of lenses $f_1$ and $f_2$ and beam shaping optics 110 in the flying optical head 106 comprised of lens $f_{3l}$ and $f_{3W}$). In one aspect, the optical system of FIG. 3 can produce an elongated laser beam having a length and width as shown in FIGS. 5 and 6. In FIG. 3, $f_1$ and $f_2$ are beam expander lenses, corresponding to beam expander 104, that receives laser beam 200 from a laser; $f_{3l}$ and $f_{3W}$ are beam shaping cylindrical lenses, as corresponding to the beam shaping optics 110 in the flying optical head 106, responsible for length (l) and width (w) of the resultant beam as shown in FIGS. 5 and 6; $d_0$ is the distance from the center of the beam waist coming out of the laser to the lens $f_1$ of the beam expander; $d_1$ is the adjustable distance between lenses $f_1$ and $f_2$; $d_2$ is the flying distance, corresponding to flying distance 108; and $d_{3l}$, $d_{3W}$ are the effective distances from lenses $f_{3l}$ and $f_{3W}$ to the glass 208. The relative position of lenses $f_1$ and $f_2$ can be adjusted to control the position of the center of the beam waist along the flying distance $d_2$ between the beam expander 104 and the flying optical head 106. FIG. 4 is an alternative example of an optical system where the relative position of lenses $f_{3w}$ and $f_{3l}$ is changed resulting in a different resultant beam width. As shown in FIGS. 5 and 6, the length (l) of the resultant elongated laser beam is substantially determined by lens $f_{3l}$ and the width (w) is substantially determined by lens $f_{3w}$. It should be noted that FIGS. 3 and 4 are optical schematics with unfolded beam paths for studying physical optics beam propagation; these figures do not show the actual orientation of the flying distance relative to the glass 208.

Table 1, shown below, provides, as an example, optical design parameters for targeted beam sizes. In Table 1, the columns for $f_{3l}$ and $f_{3w}$ give the focal lengths for these lenses. Further, the columns for $d_{3l}$ and $d_{3w}$ show the distance between the lenses $f_{3l}$ and $f_{3w}$ and the initial, or nominal target, position of the glass. During operation of the laser scoring system, the distances $d_{3l}$ and $d_{3w}$ may change. The particular choice of the beam size and length-to-width ratio are defined by process requirements, which include but are not limited to scoring speed, straightness of the cut edge, amplitude of the glass bowing, change in glass thickness, or movement of the glass relative to the beam shaping optics of the flying optical head from the nominal target position of the glass such as by, for example, random movement of the glass during the forming process, flying distance (or glass size), acceptable residual stress level, available laser power, quality and type of the laser mode.

TABLE 1

| Beam width | Beam length | $f_{3l}$ (mm) | $f_{3w}$ (mm) | $d_2$ (mm) | $d_{3l}$ (mm) | $d_{3w}$ (mm) |
|---|---|---|---|---|---|---|
| 1.0 | 100 | −375 | 800 | 500–4500 | 1000 | 800 |
| 1.0 | 200 | −158 | 800 | 500–4500 | 1000 | 800 |
| 1.5 | 100 | −375 | 1200 | 500–4500 | 1000 | 1200 |
| 1.5 | 200 | −158 | 1200 | 500–4500 | 1000 | 1200 |

EXAMPLES

To further illustrate the principles of the present invention, the following description is put forth so as to provide those of ordinary skill in the art with a complete disclosure and description of how the systems and methods claimed herein can be made and evaluated. This description is intended to be purely exemplary of the invention and is not intended to limit the scope of what the inventors regard as their invention. Efforts have been made to ensure accuracy with respect to numbers (e.g., amounts, temperatures, etc.); however, some errors and deviations may have occurred.

As provided above, the stationary part of the beam delivery system, that in one embodiment includes the laser and the beam expander, maintains substantially constant laser beam characteristics throughout the entire flying distance. In one aspect, the optical system can be created for the standard Gaussian laser mode known as TEM00 mode, and also for the so-called D-mode. D-mode is a 60/40 blend of TEM01* (or "donut") mode and TEM00 mode (or "S-mode"). An $M^2$ factor can be used to characterize the beam quality, and the beam size can be determined using the $1/e^2$ definition, which defines the boundaries of the laser beam as the locations where beam intensity has fallen to $1/e^2$ of its peak value according to the ISO11146 standard. A perfect D mode has a beam quality factor $M^2$=1.67, but an actual $M^2$ is somewhere between 2.3 and 2.4 for different lasers at different power levels. Therefore, an average $M^2$ value of 1.7 to 2.50 can be used for system design. In general, a real laser beam may be simulated by a Gaussian beam with a waist size scaled by a factor of 1/M. In one example, a typical beam waist diameter for modeling purpose was about 12.7 mm, with the waist located at 0.2 m from the output coupler of the laser.

The beam expander increases the laser beam size and projects the center of the waist at the desired position. The expansion ratio is determined by considering the laser parameters and flying distance desired. It is desirable to keep aberration of the beam expander to a minimum because any aberration introduced by the optical system can reduce the beam quality and render the beam more divergent. Simulation shows that a beam expander constructed with high F-number spherical ZnSe lenses has negligible aberration, though other lenses are contemplated within the scope of the invention. Beam expanders based on off-axis spherical mirrors with minimum astigmatism are also commercially available. Therefore both refractive and reflective beam expanders are viable options and may have a negligible aberration. The beam expander may be one providing for a fixed amount beam expansion, or one that may provide an adjustable amount of beam expansion.

Figure 7:
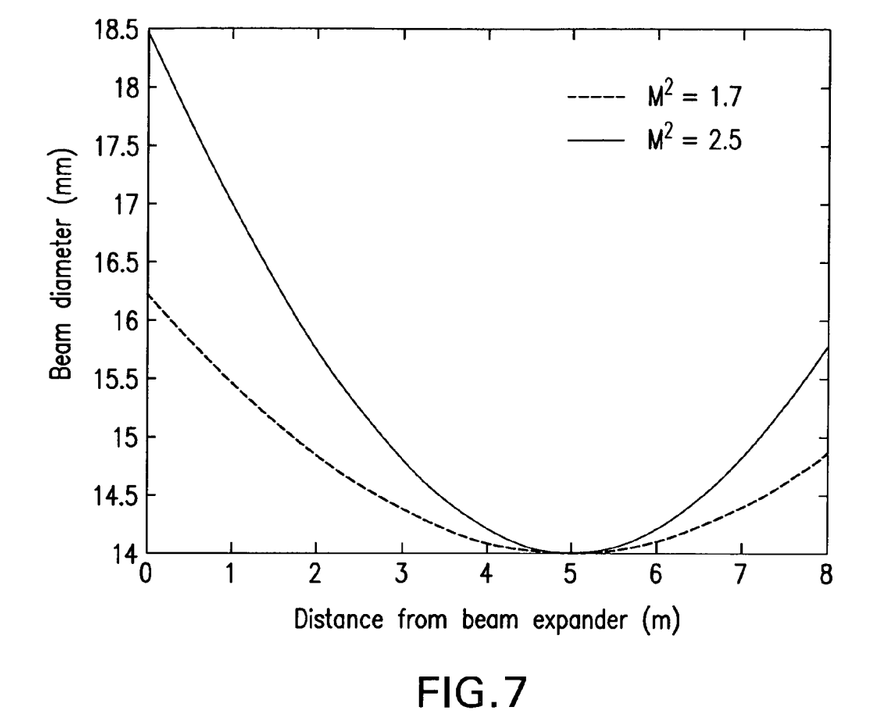
FIG. 7 is a calculated graph of laser beam diameter as a function of the distance from beam expander for a laser beam having a 14 mm diameter beam waist.
Figure 8:
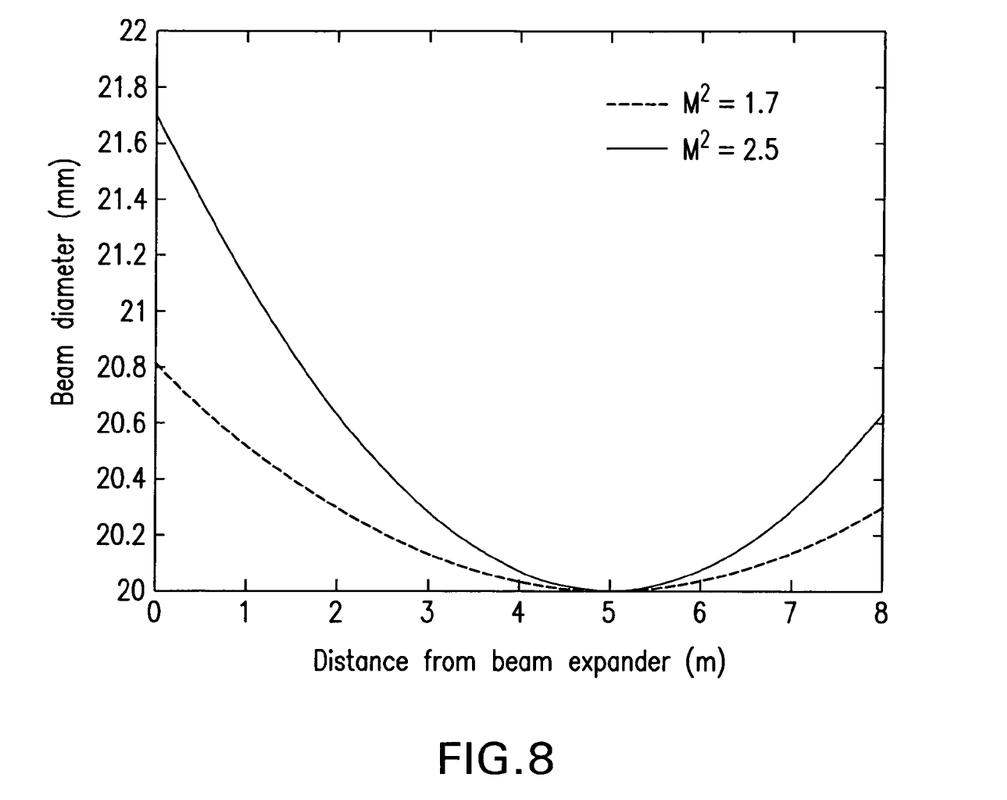
FIG. 8 is a calculated graph of laser beam diameter as a function of the distance from beam expander for a laser beam having a 20 mm diameter beam waist and show that, the beam size variation is less than about 3% even with a 6 meter flying distance.

In many instances, propagation of a laser beam, such as a $CO_2$ laser beam, is similar to that of a Gaussian beam. If the beam waist size is $\omega_{R0}$, and the quality factor is $M^2$, the beam size $\omega_R(z)$ evolves following the relations:

$$\omega_R(z) = \omega_{R0} \sqrt{1 + \left(\frac{z}{z_0}\right)^2} \quad (1)$$

$$2z_0 = \frac{2\pi \left(\frac{\omega_{R0}}{M}\right)^2}{\lambda} \quad (2)$$

where $2_{z0}$ is the Rayleigh distance, where $z_0$ is the origin of the z-axis and is defined to coincide with the beam waist, z is the distance along the beam axis from the beam waist, and $\lambda$ is the wavelength. Propagation of the laser beam through a multi-element optical system is simulated using the ABCD matrix method, as known to one of ordinary skill in the art. The simulated results, when compared with the physical optical propagation simulations of ZEMAX, have shown excellent agreement. FIG. 7 shows that if the beam waist of the beam exiting the beam expander is about 14 mm, the beam width variation may be about 6% to 13% over an approximately 6 m flying distance. FIG. 8 shows that if the beam waist is increased by the beam expander to about 20 mm, the beam width variation is reduced to less than about 3% even with approximately a 6 meter flying distance. Further increasing the beam diameter of the beam exiting the beam expander further decreases beam diameter variations over longer flying distances. In one aspect, a 2× beam ratio can be selected, which doubles the laser beam size in the flying distance, though other ratio beam expanders can also be used.

In addition to the beam expander, in one embodiment the beam delivery system can include a number of routing mirrors and/or beam switches to direct the expanded beam to the flying optical head. Beam tubes can be used for fixed optical paths, and the flying path can be enclosed in a flexible bellow. Generally, if beam tubes are used, the inner diameter of the beam tube should be at least twice the diameter of the expanded beam. The use of beam tubes also influences the selection of mirror size for the turning mirror (beam bender).

The beam shaping optics, which in one embodiment is a set of cylindrical lenses, $f_{3w}$ and $f_{3l}$ transforms a circular beam from, for example, a size of about 25 mm in diameter as shown in FIGS. 3 and 4 into an approximately 60~200 mm long and about 1~1.5 mm wide elliptical beam. In other instances, the circular beam can be transformed into an elongated beam having a beam length of approximately 60 to 300 mm and a beam width of approximately 1.0 to 3.0 mm.

In FIG. 3, for example, a laser beam 200 having an approximately 13 mm diameter beam waist 202 enters a beam expander, comprised of lenses $f_1$ and $f_2$ in this instance, where the laser beam 200 is expanded to an expanded laser beam having a beam waist 204 of approximately 25 mm diameter. The diameter of the expanded laser beam is substantially constant throughout the flying distance $d_2$ of the optical head as the center of the beam waist 204 of the expanded laser beam is approximately centered in the flying distance $d_2$, and the flying distance $d_2$ is less than the Rayleigh distance of the expanded laser beam. The expanded laser beam then enters the flying optical head where the beam shaping optics comprised of lenses $f_{3l}$ and $f_{3w}$ in this example form the elongated beam 206 on the glass 208. In this instance, $f_{3l}$ is used to form the length of the elongated beam 206 on the glass 208 and $f_{3w}$ is used to form the width of the elongated beam 206 on the glass 208. As shown in the embodiment of FIG. 3, the nominal distance $d_{3l}$ from lens $f_{3l}$ to the surface of the glass 208 is greater than the nominal distance $d_{3w}$ from lens $f_{3w}$ to the surface of the glass 208. As shown in FIG. 3, this exemplary arrangement of beam shaping optics results in the approximately 200×1.0 mm² elongated beam 206 on the glass 208. Similarly, the exemplary beam shaping optics of FIG. 4 results in the approximately 200×1.5 mm² elongated beam 210 on the glass 208. As shown in the embodiment of FIG. 4, the nominal distance $d_{3l}$ from lens $f_{3l}$ to the surface of the glass 208 is less than the nominal distance $d_{3l}$ from lens $f_{3l}$ to the surface of the glass 208. It is to be appreciated that the beam shaping optics as shown in FIGS. 3 and 4 are exemplary in nature and other designs can result in different beam sizes, lens arrangements, flying distances, and resultant beam shapes on the glass.

With a highly collimated laser beam entering the flying optical head, the main variable comes from a change in the distances $d_{3l}$ and $d_{3l}$ between the local glass surface and the lenses $f_{3l}$ and $f^{3w}$, respectively, such as, for example, due to glass bowing, change in glass thickness, or movement of the glass relative to the optics from the nominal target position of the glass such as by, for example, random movement of the glass during the forming process. The change in the distances $d_{3l}$ and $d_{3w}$ impacts the actual beam length and beam width on the glass. The effect can be estimated based on Gaussian beam propagation.

In one embodiment, an elongated beam is generated by spreading out the collimated beam using a negative cylindrical lens or mirror. The divergent angle $\theta$, as shown in FIG. 5, determines the extent of beam length change as a result of a change $\Delta$ in the glass 208 position relative to the lens $f_{3l}$, such as, for example, due to glass bowing, change in glass thickness, or movement of the glass relative to the optics from the nominal target position of the glass such as by, for example, random movement of the glass during the forming process. As an example using the illustration of FIG. 5, to generate a 200 mm beam length, (l), with a variation of less than ±2.5% for a change $\Delta$ in glass position of ±25 mm, it can be shown by trigonometry that the fan-out angle should be less than 6°, and the stand-off distance between the lens and the glass should be at least 1 meter. Beam length variation can be reduced or eliminated by collimating the beam. For shorter beam lengths, the variation is reduced proportionally.

In one embodiment, a second cylindrical lens $f_{3w}$ focuses the other axis of the beam into about 1.0 to about 3.0 mm wide. FIG. 6 shows how the change $\Delta$ in the position of the glass 208 relative to the lens $f_{3w}$ effects the width of the beam.

Like the flying path, to make the beam width less sensitive to the change Δ in glass position, the glass is preferably approximately centered in the Rayleigh range. The Rayleigh range, which is dictated by the beam waist, is much larger than the maximum change Δ in position of the glass 208 relative to the lens $f_{3w}$.

Figure 9:
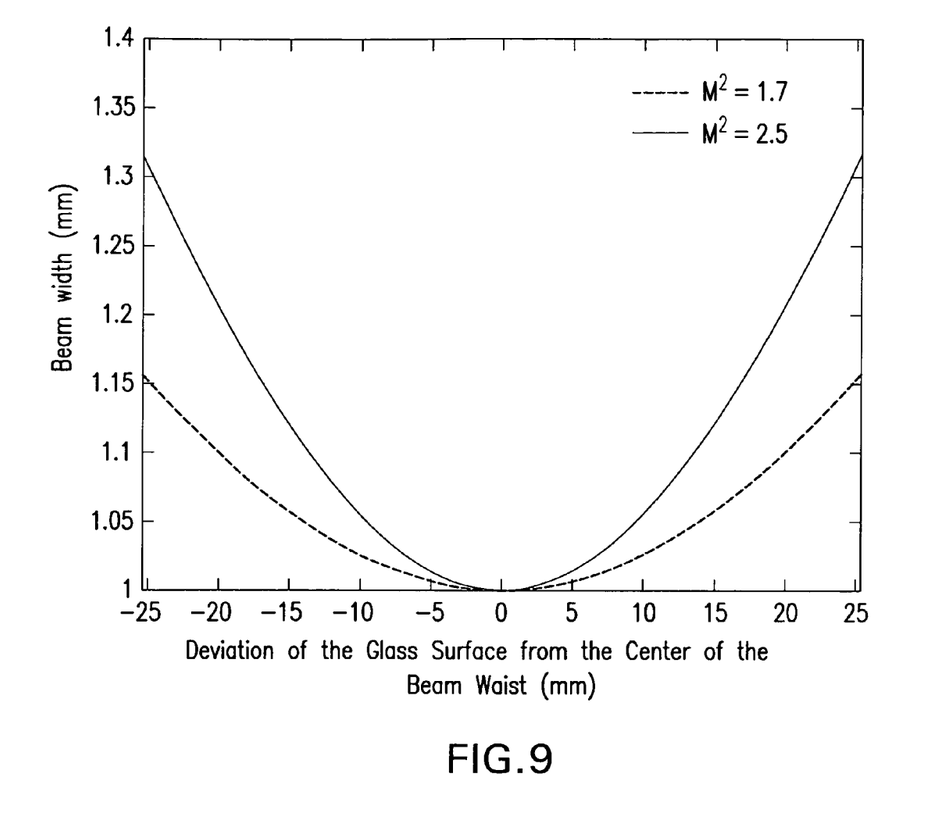
FIG. 9 is a graph of beam width variation as a function of deviation of the glass surface from the center of the beam waist for an exemplary elongated beam having a beam width of 1 mm.
Figure 10:
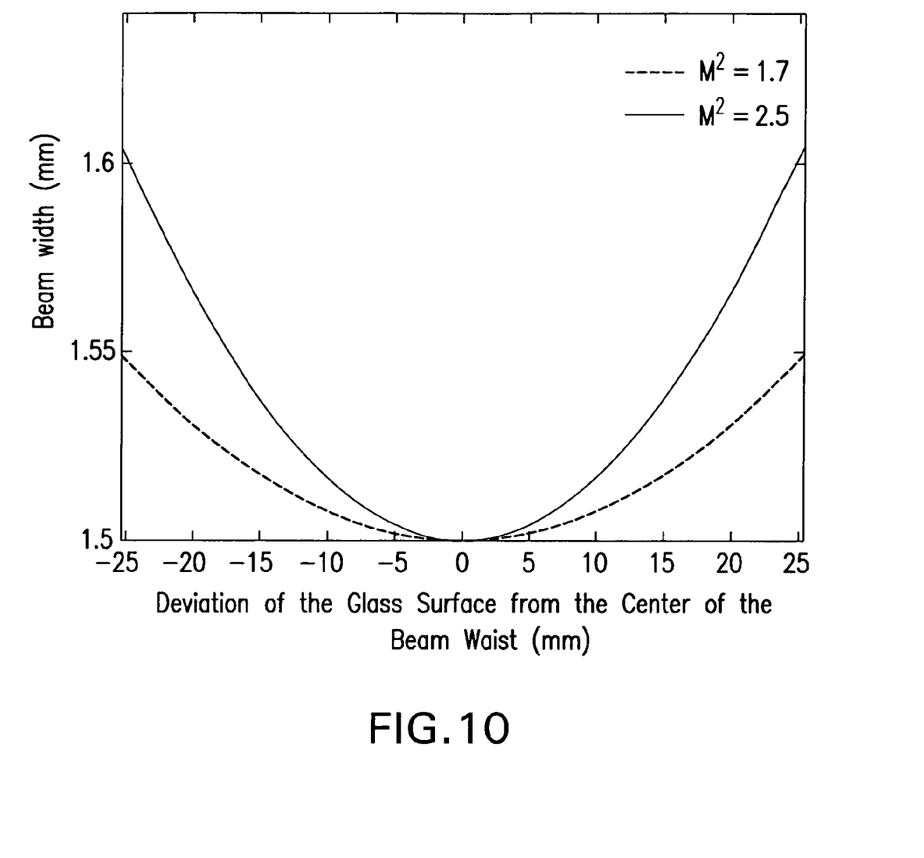
FIG. 10 is a graph of beam width variation as a function of deviation of the glass surface from the center of the beam waist for an explary elongated beam having a beam width of 1.5 mm.

FIGS. 9 and 10 show, as an example, beam width variations as a function of deviation of the glass surface from the center of the beam waist for exemplary beam widths of 1 mm and 1.5 mm. It can be seen from FIGS. 9 and 10 that beam width variations are reduced as the beam width is increased from 1 to 1.5 mm. The laser beam quality factor $M^2$ also makes a difference in both cases. Better beam quality results in smaller beam width variation and, hence, less system sensitivity to the glass shape can be achieved. More particularly, FIG. 9 shows that for a target beam width of 1 mm, the deviation in glass position from the center of the beam waist can cause over 30% width variation, while FIG. 10 shows for a target width of 1.5 mm, the variation is reduced to 7%. The laser beam quality factor $M^2$ also makes a difference in both cases.

In one example, the optical systems as shown in FIGS. 3 and 4 were simulated and evaluated by paraxial Gaussian beam propagation. The merit function for system evaluation was based on the closeness of beam size to the target, minimum beam area variation over the flying distance and over the change in distances $d_{3l}$ and $d_{3w}$ from the beam shaping optics $f_{3l}$ and $f_{3w}$ to the glass surface by, for example, glass bow, or by change in glass thickness, or by movement of the glass relative to the optics from the nominal target position of the glass such as by, for example, random movement of the glass during the forming process. The target beam size determines the focal lengths of the beam shaping lenses $f_{3w}$ and $f_{3l}$, while $d_{3l}$ and $d_{3w}$ are chosen for best beam size consistency. Results for the targeted beam sizes are summarized in Table 1, above, and because the beam width is only determined by $f_{3w}$, and the beam length by $f_{3l}$, Table 1, contains the design of at least four beam size combinations as shown.

FIGS. 11 through 14 show the beam size (width and length) on the glass surface as a function of the distance $d_{3w}$ between lens $f_{3w}$ and the glass, of the distance $d_{3l}$ between lens $f_{3l}$ and the glass, wherein the distances $d_{3w}$ and $d_{3l}$ change due to glass bow (or change in glass thickness, or movement of the glass relative to the optics from the nominal target position of the glass such as by, for example, random movement of the glass during the forming process) for example, and as a function of the flying distance d2. As shown, change in glass position is the largest contributor to the beam size variation for the beam width of less than 1.5 mm.

Figure 11:
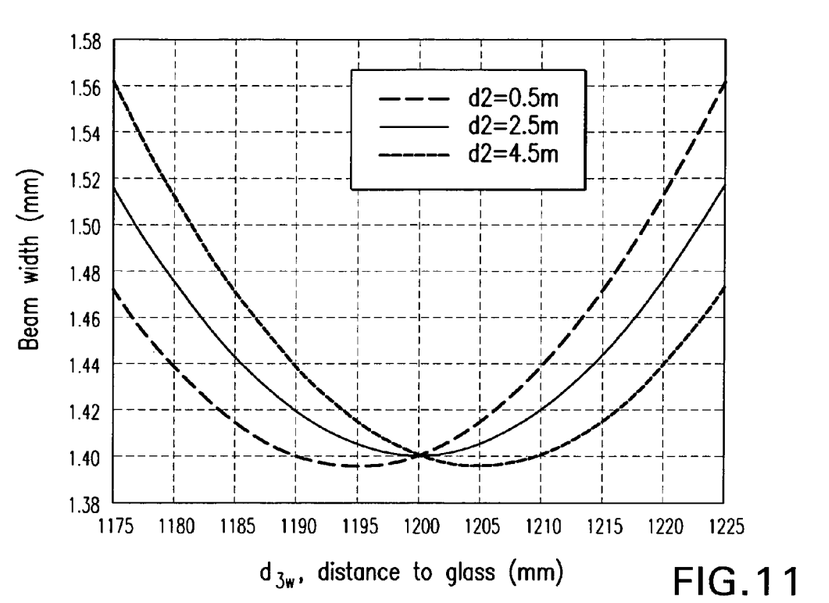
FIG. 11 is a calculated graph that shows the beam size (width) on the glass surface as a function of the change in distance $d_{3W}$ between the glass and the lens $f_{3w}$, (such as, for example, due to glass bowing, change in glass thickness, or movement of the glass relative to the optics from the nominal target position of the glass such as by, for example, random movement of the glass during the forming process), and the flying distance (d2) for an optical system such as the one shown in FIG. 4 and with $d_{3w}$ initially set at approximately 1200 mm.
Figure 12:
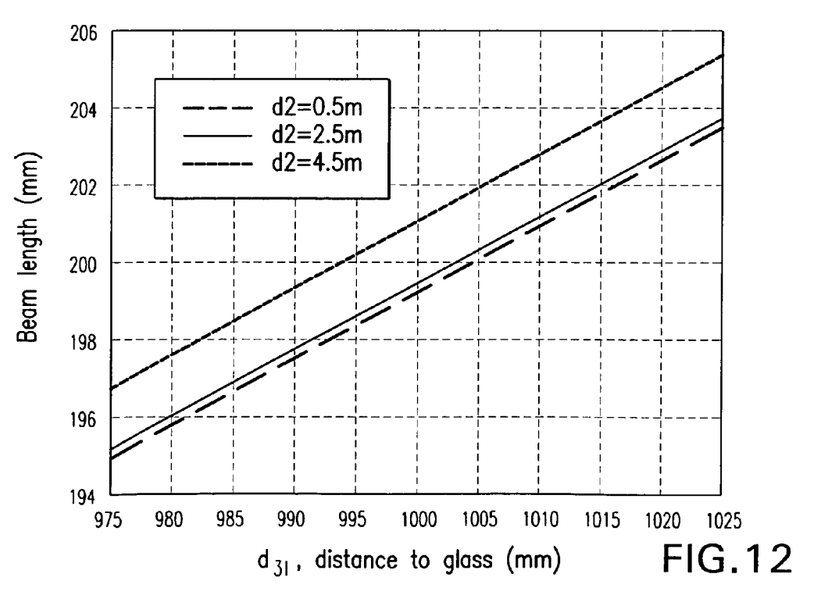
FIG. 12 is a calculated graph that shows the beam size (length) on the glass surface as a function of the change in distance $d_{3l}$ between the glass and the lens $f_{3l}$, (such as, for example, due to glass bowing, change in glass thickness, or movement of the glass relative to the optics from the nominal target position of the glass such as by, for example, random movement of the glass during the forming process), and the flying distance (d2) for an optical system such as the one shown in FIG. 4 and with $d_{3l}$ initially set at approximately 1000 mm.

For a beam width of about 1.4 mm the results depicted in FIGS. 11 and 12 show, that for an optical system such as the one shown in FIG. 4 and with $d_{3w}$ initially set at approximately 1200 mm and $d_{3l}$ initially set at approximately 1000 mm, that the beam size width variation is within +/−5% and the beam size length variation is less than +/−2% for a change in distance (either $d_{3w}$ or $d_{3l}$) of +/−20 mm.

Figure 13:
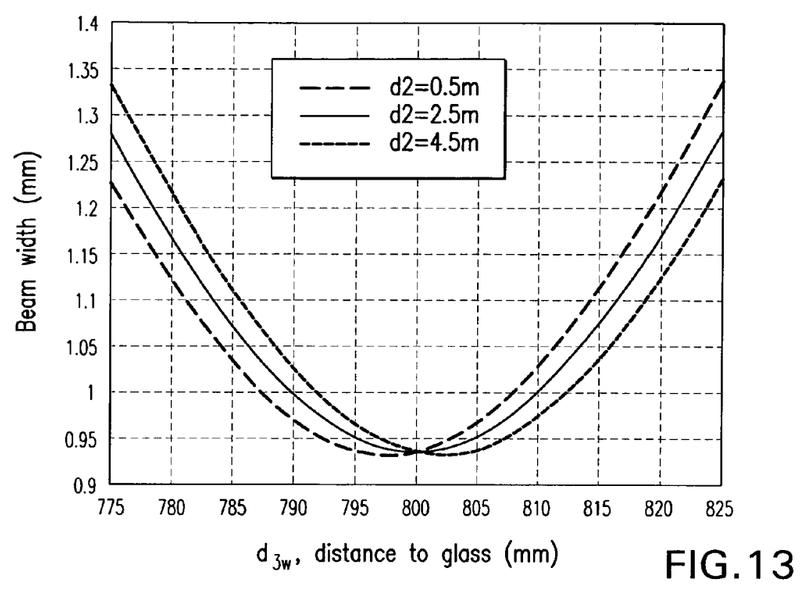
FIG. 13 is a graph that shows the beam size (width) on the glass surface as a function of the change in distance $d_{3W}$ between the glass and the lens $f_{3w}$, (such as, for example, due to glass bowing, change in glass thickness, or movement of the glass relative to the optics from the nominal target position of the glass such as by, for example, random movement of the glass during the forming process), and the flying distance $d_2$ for an optical system such as the one shown in FIG. 3 and with $d_{3w}$ initially set at approximately 800 mm.
Figure 14:
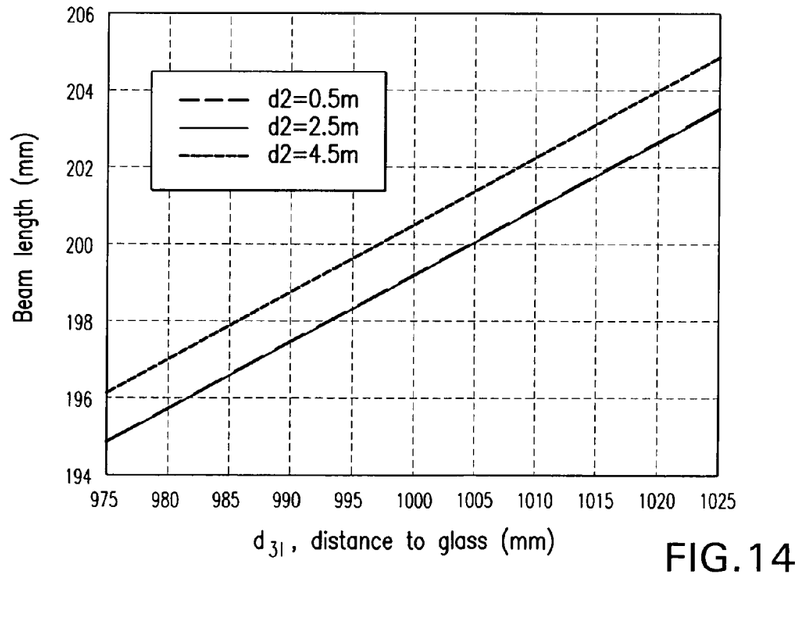
FIG. 14 is a graph that shows the beam size (length) on the glass surface as a function of the change in distance $d_{3l}$ between the glass and the lens $f_{3l}$, (such as, for example, due to glass bowing, change in glass thickness, or movement of the glass relative to the optics from the nominal target position of the glass such as by, for example, random movement of the glass during the forming process), and the flying distance $d_2$ for an optical system such as the one shown in FIG. 3 and with $d_{3l}$ initially set at approximately 1000 mm.

Even for the narrow beam of about 0.95 mm to about 1.0 mm width, FIGS. 13 and 14 show that for an optical system such as the one shown in FIG. 3, having $d_{3w}$ initially set at approximately 800 mm and $d_{3l}$ initially set at approximately 1000 mm, the beam size width variation does not exceed +/−5% and the beam size length variation does not exceed +/−2%, for a change in distance (either $d_{3w}$ or $d_{3l}$) that is within ±10 mm.

Table 2, shown below, summarizes actual lens specifications developed for the corresponding targets of beam widths and lengths in exemplary embodiments. Table 2 provides actual plano-convex (PO/CX)/plano-concave (PO/CC) cylinder lens prescriptions (lens material ZnSe; anti-reflection coated at 10.6 μm) for the exemplary embodiments. These lens prescriptions may also be used with other lens material, and with or without the anti-reflection coating. The radii of curvature of the plano-convex and plano-concave lens designs were calculated based on the preferred effective focal lengths. For this particular optical system the initial mounting position of the negative cylindrical lenses $f_{3l}$ is set at a distance $d_{3l}$ of 1000 mm from the target glass position. For the lens $f_{3w}$ the initial mounting position is a function of the focal length, and is set so that the distance $d_{3w}$ is approximately equal to the focal length of lens $f_{3w}$, which helps minimize the effect of the flying position on the beam width.

TABLE 2

| Beam size (mm) | Lens type | Effective Focal Length, (mm) | Radius of Curvature, (mm) | Lens size |
|---|---|---|---|---|
| W = 1 | PO/CX | 800 | 1122.5 | 2" × 4" |
| W = 1.5 | PO/CX | 1200 | 1684 | Φ 2" |
| L = 100 | PO/CC | −375 | −526 | □ 2" |
| L = 150 | PO/CC | −220 | −308 | Φ 2" |
| L = 200 | PO/CC | −158 | −222 | Φ 2" |
| L = 250 | PO/CC | −124.5 | −174.7 | Φ 2" |
| L = 300 | PO/CC | −101.5 | −142.4 | Φ 2" |

Exemplary Application

Figure 15:
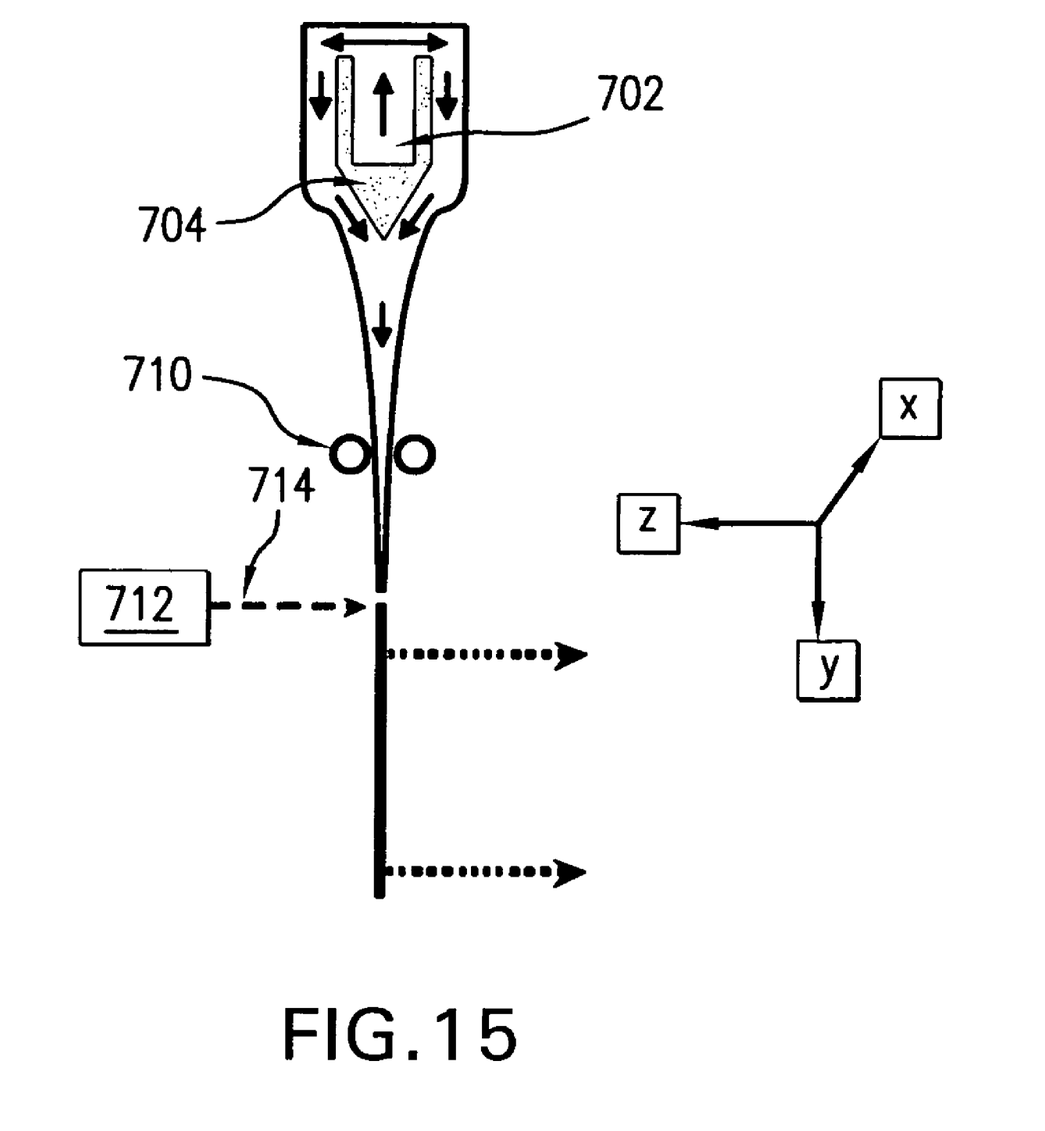
FIG. 15 is a schematic diagram of an embodiment of a laser scoring system incorporated into an exemplary glass-making process.

Embodiments of the laser scoring system can be incorporated into a glass-making process such as, for example, a down-draw glass making-process or a down-draw fusion glass-making process as schematically shown in cross-section in FIG. 15. FIG. 15 illustrates an embodiment of a laser scoring system as can be utilized with vertically oriented glass. Of course, the laser scoring system disclosed herein can also be used on horizontally, or otherwise, oriented glass. As shown in FIG. 15, molten glass 702 overflows an isopipe 704, as known to one of ordinary skill in the art, and fuses below the isopipe 704. The hot glass then is formed and travels downward with the assistance of two or more rollers 710 and continuously moves downward relative to the page of FIG. 15 (i.e., in a "y-direction" according to the coordinate system shown in FIG. 15). The illustrated embodiment of the laser scoring system shown in FIG. 15 is comprised of a scoring apparatus 712 for scoring the glass as the glass is being processed. In one aspect, the scoring apparatus 712 can comprise a laser, a beam expander and a flying optical head, substantially as described above. The beam expander receives a laser beam from the laser and expands the laser beam to an expanded laser beam having a beam waist approximately at a center of a flying distance traversed by the flying optical head that moves relative to the laser and the beam expander. As shown in FIG. 15, the flying optical head can move in a +/−x-direction (i.e., into and out of the plane of FIG. 15). The change Δ in glass position (such as by glass bowing, change in glass thickness, or movement of the glass relative to the optics of the flying optical head from the nominal target position of the glass such as by, for example, random movement of the glass during the forming process) of the hot glass is in a +/−z-direction, while the glass generally moves in a y-direction during the fabrication process. The flying optical head is configured to receive the expanded laser beam from the beam expander and focus the expanded laser beam into an elongated laser beam 714. In one aspect the elongated laser beam 714 has a beam waist and an extended focal depth of greater than +/−5 mm relative to the center of the beam waist. The elongated laser beam 714 has a power density throughout the extended focal depth sufficient for scoring the glass disposed so that at least a portion of the glass is within the extended focal depth. Not shown in FIG. 15 is apparatus for thermally shocking the glass after scoring. Once the glass is scored, it can be separated and/or transported from the manufacturing process. For example, a glass handling system or robot can be used to complete the separation of the glass and transport it from the manufacturing area.

In conclusion, described herein is a laser scoring system, which allows delivery to a material of a laser beam of nearly constant size and, correspondingly, of nearly constant power density, that is insensitive to the changes of the optical head position along the flying distance, and to the distance between the optical head and the glass, without active compensation. Beam size variations induced by changes of the flying position can be minimized to less than 1% over a flying distance of up to 4 m. At the same time, variations of the beam size due to changes of the distance between the glass surface and the optical head can be minimized to enable a substantially consistent laser scoring process even over a change in this distance of greater than +/−5 mm.

While the systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations can be made without departing from the scope or spirit. Other embodiments will be apparent to those skilled in the art from consideration of the specification and practice of the principles disclosed herein. It is intended that the specification and examples be considered as examples only, with a true scope and spirit being indicated by the following claims.

What is claimed is:

1. A system comprising:
   an optical head having an input to receive output from a laser, and having beam shaping optics to focus the output into an elongated laser beam having a beam waist, the beam waist having a center, the elongated laser beam having an extended focal depth of greater than about +/−5 mm relative to the center of the beam waist, the elongated laser beam having a power density throughout the extended focal depth sufficient for scoring a material a portion of which is disposed within the extended focal depth.

2. The system as set forth in claim 1, further comprising a laser coupled to the optical head and providing the output to the optical head.

3. The system of claim 2, further comprising a beam expander disposed between the laser and the optical head, wherein the beam expander receives the output from the laser, expands the output from the laser to an expanded laser beam, and transmits the expanded laser beam to the optical head.

4. The system of claim 3, wherein the beam expander is in a fixed position and the optical head is a flying optical head that moves relative to the beam expander.

5. The system of claim 4, wherein the flying optical head has a flying distance of about 0.5 meters to about 6 meters, wherein the expanded beam has a waist with a center, and the beam expander is configured to project the center of the waist of the expanded laser beam approximately at a center of the flying distance.

6. The system of claim 2, wherein the extended focal depth is up to about +/−20 mm, and the elongated laser beam has a beam length and a beam width, wherein the beam width varies less than +/−5% and the beam length varies less than +/−2% over the range of the extended focal depth.

7. The system of claim 2, wherein the elongated laser beam further comprises a beam length of about 60 mm to about 300 mm and a beam width of about 1 mm to about 3 mm, and the extended focal depth is greater than or equal to about +/−10 mm.

8. The system of claim 7, wherein the power density throughout the extended focal depth varies less than or equal to about 5%.

9. The system of claim 8, wherein the elongated laser beam further comprises a length of about 200 mm and a width of about 1.5 mm, and the extended focal depth is about +/−25 mm.

10. The system of claim 8, wherein the elongated laser beam further comprises a length of about 200 mm and a width of about 1.0 mm, and the extended focal depth is about +/−20 mm.

11. The system of claim 1, wherein the beam shaping optics comprises one or more lenses.

12. The system of claim 1, wherein the beam shaping optics comprises two lenses configured and arranged so that each lens independently shapes one axis of the resultant beam.

13. A system comprising:
   a glass manufacturing apparatus for producing glass; and
   a scoring apparatus positioned for scoring the glass as it is produced, the scoring apparatus comprising:
     a laser;
     a beam expander, positioned to receive a laser beam from the laser, and expand the laser beam to an expanded laser beam, the expanded laser beam having a waist with a center; and
     a flying optical head positioned to receive the expanded laser beam, the flying optical head being movable over a flying distance relative to the beam expander, the flying distance having a center,
   wherein the beam expander forms the expanded laser beam so that the center of the waist of the expanded laser beam is approximately at the center of the flying distance,
   wherein the flying optical head is configured to change the expanded laser beam into an elongated laser beam having a beam waist with a center, the elongated laser beam having an extended focal depth of greater than +/−5 mm relative to the center of the waist of the elongated laser beam, the elongated laser beam having a power density throughout the extended focal depth sufficient for scoring the glass,
   wherein the glass manufacturing apparatus and the scoring apparatus are disposed relative to one another so that a portion of the glass produced by the glass manufacturing apparatus is disposed within the extended focal depth.

14. The system of claim 13, wherein the elongated laser beam has a Raleigh range, and the glass is at a distance from the flying optical head that is less than the Raleigh range.

15. The system of claim 14, wherein the distance from the glass to the flying optical head varies as the glass and the flying optical head move relative to one another.

16. The system of claim 13, wherein the power density throughout the extended focal depth varies less than or equal to about 5%.

17. The system of claim 13, wherein the glass manufacturing apparatus for producing glass comprises a down-draw glass manufacturing apparatus, and the scoring apparatus is disposed so as to focus the elongated laser beam onto the glass when the temperature of the glass is from about 25° C. to about 600° C.

18. The system of claim 13, wherein the extended focal depth is up to about +/−20 mm, and the elongated laser beam has a beam length and a beam width, wherein the beam width varies less than +/−5% and the beam length varies less than +/−2% over the range of the extended focal depth.

19. A laser scoring system comprising:
a laser;
a beam expander fixed in position relative to the laser, wherein the beam expander receives a laser beam from the laser and expands the laser beam to an expanded laser beam having a waist, the waist having a center; and
a flying optical head positioned to receive the expanded laser beam and change the expanded laser beam into an elongated laser beam having a beam waist, the waist of the elongated beam having a center, and the elongated laser beam having an extended focal depth relative to the center of the waist of the elongated laser beam, the flying optical head being movable over a flying distance of about 0.5 meters to about 6 meters,
wherein the expanded laser beam is positioned so that the center of the waist of the expanded laser beam is approximately at a center of the flying distance;
wherein the elongated laser beam has a power density throughout the extended focal depth sufficient for scoring a material a portion of which is disposed within the extended focal depth,
wherein the elongated laser beam has a length of about 60 mm to about 300 mm, and a width of about 1 mm to about 3 mm, and the extended focal depth is from about +/−5 mm to about +/−50 mm.

20. The laser scoring system of claim 19, wherein the elongated laser beam has a length of about 100 mm to about 200 mm and a beam width of about 1 mm to about 1.5 mm.

* * * * *